US010676638B2

(12) United States Patent
Chen et al.

(10) Patent No.: US 10,676,638 B2
(45) Date of Patent: Jun. 9, 2020

(54) FORMALDEHYDE-SCAVENGING COATING COMPOSITION

(71) Applicant: Valspar Sourcing, Inc., Minneapolis, MN (US)

(72) Inventors: Xiaorui Chen, Guangdong (CN); Yanchang Gan, Guangdong (CN); Yongzhi Tan, Guangdong (CN); Xi Zhao, Guangdong (CN); Gang Duan, Chicago, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 14 days.

(21) Appl. No.: 16/071,021

(22) PCT Filed: Jan. 19, 2017

(86) PCT No.: PCT/US2017/014134
§ 371 (c)(1),
(2) Date: Jul. 18, 2018

(87) PCT Pub. No.: WO2017/127544
PCT Pub. Date: Jul. 27, 2017

(65) Prior Publication Data
US 2019/0023937 A1 Jan. 24, 2019

(30) Foreign Application Priority Data

Jan. 19, 2016 (CN) .......................... 2016 1 0033536

(51) Int. Cl.
C08G 63/52 (2006.01)
C09D 167/06 (2006.01)
C08G 63/91 (2006.01)
C09D 133/04 (2006.01)
C09D 133/14 (2006.01)

(52) U.S. Cl.
CPC ............ *C09D 167/06* (2013.01); *C08G 63/52* (2013.01); *C08G 63/918* (2013.01); *C09D 133/04* (2013.01); *C09D 133/14* (2013.01)

(58) Field of Classification Search
USPC ...................................................... 528/306
See application file for complete search history.

(56) References Cited

U.S. PATENT DOCUMENTS 6,780,523 B2   8/2004   Kuo et al.
9,803,045 B2   10/2017  Killilea
2008/0013506 A1 6/2008  Kuo et al.

FOREIGN PATENT DOCUMENTS

| CN | 1659209 A | 8/2005 |
| CN | 101061192 A | 10/2007 |
| CN | 103055465 A | 4/2013 |
| EP | 0570213 A2 | 11/1993 |
| JP | H11197502 A | 7/1999 |
| WO | 2014191573 A1 | 12/2014 |

OTHER PUBLICATIONS

Extended Search Report from counterpart European Application No. 17741925.6, dated Aug. 21, 2019, 6 pp.
Examination Report from counterpart Canadian Application No. 3,014,908 dated Jul. 12, 2019, 3 pp.
First Office Action and Search Report, and translation thereof, from counterpart Chinese Application No. 201610033536.2, dated Jun. 27, 2018, 10 pp.
International Search Report and Written Opinion of International Application No. PCT/US2017/014134, dated Mar. 28, 2017, 11 pp.
International Preliminary Report on Patentability from International Application No. PCT/US2017/014134, dated Jul. 24, 2018, 7 pp.
Response to Examination Report dated Jan. 10, 2019, from counterpart Canadian Application No. 3,014,908, 16 pp.
Notice of Allowance from counterpart Canadian Application No. 3,014,908, dated Apr. 29, 2020, 1 pp.
Response to Communication pursuant to Rules 70(2) and 70a(2), dated Sep. 6, 2019 and to European Search Opinion dated Aug. 21, 2019, from counterpart European Application No. 17741925.6, filed Mar. 16, 2020, 15 pp.

*Primary Examiner* — Terressa Boykin
(74) *Attorney, Agent, or Firm* — Shumaker & Sieffert, P.A.

(57) ABSTRACT

A curable resin composition includes an acetoacetyl functional unsaturated polyester with a branched molecular skeleton containing olefinically unsaturated functional groups therein and acetoacetyl functional groups chemically bonded to the branched molecular skeleton. The acetoacetyl functional unsaturated polyester contains at least 2 wt % of the olefinically unsaturated functional groups, relative to the total weight of the acetoacetyl functional unsaturated polyester, and at least 20 wt % of the acetoacetyl functional groups, relative to the total weight of the acetoacetyl functional unsaturated polyester. The curable resin composition can be used to formulate coating compositions.

11 Claims, No Drawings

FORMALDEHYDE-SCAVENGING COATING COMPOSITION

CROSS REFERENCE TO RELATED APPLICATIONS

This application is a national stage entry under 35 U.S.C. § 371 of PCT Application No. PCT/US2017/014134, filed Jan. 19, 2017, which claims the benefit of Chinese Application No. 201610033536.2, filed Jan. 19, 2016. The entire contents of PCT Application No. PCT/US2017/014134 and Chinese Application No. 201610033536.2 are incorporated herein by reference.

BACKGROUND

Coating compositions for indoor and outdoor applications should provide excellent product performance with low toxicity and good environmental compatibility. UV-curable coating compositions have been widely used to decorate and protect the surface of wood products. However, such coating compositions can contain small amounts of formaldehyde caused by degradation of their organic components, and the coating thus formed can potentially release formaldehyde into the environment. Therefore, it is desirable to minimize the formaldehyde content of wood coating compositions.

Small molecules and polymers having an active methylene group can react with the free formaldehyde in a coating composition and scavenge formaldehyde. However, these compounds are not particularly well suited for use in coating compositions, especially UV curable coating compositions. Thus, there is still a need for formaldehyde-scavenging components that are suitable for use in UV-curable coating compositions.

SUMMARY

In one aspect, the present disclosure is directed to a curable resin composition, including an acetoacetyl-functional unsaturated polyester with a branched molecular skeleton containing olefinically unsaturated functional groups therein and acetoacetyl functional groups chemically bonded to the branched molecular skeleton. The acetoacetyl functional unsaturated polyester contains at least 2 wt % of the olefinically unsaturated functional groups, relative to the total weight of the acetoacetyl functional unsaturated polyester. The acetoacetyl functional unsaturated polyester further contains at least 20 wt % of the acetoacetyl functional groups, relative to the total weight of the acetoacetyl functional unsaturated polyester. In one embodiment, the acetoacetyl-functional unsaturated polyester may have a hydroxyl value of about 5 to about 80 mg KOH/g.

In one embodiment, the acetoacetyl functional unsaturated polyester is obtained by: (a) reacting by esterification: (i) a carboxylic acid component, at least a portion of which includes one or more unsaturated di- or poly-basic carboxylic acid with (ii) an alcohol component, at least a portion of which includes one or more di- or poly-basic alcohol, wherein the carboxylic acid component or the alcohol component additionally contains one or more tri- or poly-basic acids or alcohols, thereby forming an unsaturated polyester having a hydroxyl value of about 350 mg KOH/g or more and having a branched molecular skeleton containing olefinically unsaturated functional groups therein, wherein the molar equivalent ratio of the alcohol component to the carboxylic acid component is 1.5:1 or more; and (b) reacting the unsaturated polyester formed in step (a) with alkyl acetoacetate by transesterification, thereby forming the acetoacetyl functional unsaturated polyester.

In another aspect, the present disclosure provides a pre-mix including the curable resin composition with the acetoacetyl functional unsaturated polyester as disclosed herein, and one or more reactive diluents having two or more olefinically unsaturated groups.

In still another aspect, the present disclosure provides a coating composition, including the curable resin composition containing the acetoacetyl functional unsaturated polyester as disclosed herein, one or more resins having olefinically unsaturated groups other than the curable resin composition as disclosed herein, one or more initiators, optionally one or more reactive diluents having two or more olefinically unsaturated groups, and optional additives.

The acetoacetyl functional unsaturated polyester contained in the curable resin composition includes a branched molecular skeleton containing olefinically unsaturated functional groups therein as well as acetoacetyl functional groups chemically bonded to the branched molecular skeleton. Thus, such acetoacetyl functional unsaturated polyester can be used as an additive for scavenging free formaldehyde in the coating composition, and can also be polymerized with the other polymerizable components in the coating composition, without significantly impacting the performance of the resulting coating.

In some embodiments, the acetoacetyl-functional unsaturated polyester has a branched molecular skeleton to which at least one of pendant or terminal acetoacetyl groups may be attached. In some embodiments, the additional acetoacetyl groups in the resin can more advantageously eliminate or reduce the free formaldehyde present in the system.

In some embodiments, the acetoacetyl-functional unsaturated polyester as a resin component added to a UV-curable or heat-curable coating composition can polymerize with other polymerizable components in the coating composition, and the cured coating thus formed retains formaldehyde-scavenging capability.

The details of one or more embodiments of the disclosure are set forth in the description below. Other features, objects, and advantages of the disclosure will be apparent from the description, and from the claims

Selected Definitions

As used herein, "a", "an", "the", "at least one", and "one or more" are used interchangeably. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of acetoacetyl-functional unsaturated polyester, the term "branched molecular skeleton" refers to such a molecular skeleton that has one or more branches protruding from the main molecular chain wherein the branches may have one or more sub-branches.

When used in the context of acetoacetyl-functional unsaturated polyester, the term, "acetoacetyl" refers to the group having the following formula:

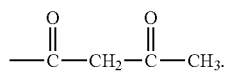

As used herein, the term "olefinically unsaturated group" refers to cis- or trans-reactive carbon-carbon double bond unsaturated groups, excluding aromatic unsaturated groups, carbon-carbon triple bond and carbon-heteroatom unsaturated groups.

As used herein, the expression "cured coating still has a formaldehyde-scavenging capability" is understood to that, when cured by heat, the cured coating can remove 70 ppm or more of free formaldehyde per gram of the cured coating; and that when cured by UV, the cured coating can remove 80 ppm or more of free formaldehyde per gram of the cured coating The terms "comprises," "includes" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

Curable Resin Composition Comprising Acetoacetyl Functional Unsaturated Polyester In one aspect, the present disclosure is directed to a curable coating composition, including an acetoacetyl-functional unsaturated polyester with a branched molecular skeleton containing olefinically unsaturated functional groups therein and acetoacetyl functional groups chemically bonded to the branched molecular skeleton. The acetoacetyl functional unsaturated polyester contains at least 2 wt % of the olefinically unsaturated functional groups, relative to the total weight of the acetoacetyl functional unsaturated polyester, and contains at least 20 wt % of the acetoacetyl functional groups, relative to the total weight of the acetoacetyl functional unsaturated polyester. The curable coating composition may include acetoacetyl functional unsaturated polyester having a wide molecular weight distribution and containing olefinically unsaturated functional groups therein. In various embodiments, the acetoacetyl functional unsaturated resin as disclosed herein may have a number average molecular weight of 1000 to 20,000 g/mol, or 1500 to 20,000 g/mol, or 2000 to 20,000 g/mol. The number average molecular weight can be determined by using GPC.

In an embodiment, the acetoacetyl-functional unsaturated polyester can have a hydroxyl value of between 5 and 80 mg KOH/g, or between 20 and 80 mg KOH/g, or between 30 and 80 mg KOH/g, or between 40 and 80 mg KOH/g. The hydroxyl value is measured according to Standard GB/T 12008.3-2009.

To provide the acetoacetyl functional unsaturated polyester with acceptable formaldehyde-scavenging capability, in various embodiments the acetoacetyl functional unsaturated polyester contains at least 15 wt % of the acetoacetyl functional groups, relative to the total weight of the acetoacetyl functional unsaturated polyester. In various embodiments, the concentration of the acetoacetyl functional group is at least 20 wt %, at least 25 wt %, at least 30 wt % or more, relative to the total weight of the acetoacetyl functional unsaturated polyester. Higher concentrations of the acetoacetyl functional groups in the acetoacetyl functional unsaturated polyester are generally desirable, but in various embodiments the concentration of the acetoacetyl functional groups is less than 55% by weight relative to the total weight of the acetoacetyl functional unsaturated polyester. The concentration of acetoacetyl functional groups in the acetoacetyl functional unsaturated polyester can conveniently be evaluated as follows:

$$C_{aceto}(\% \text{ by weight}) = n \times M_{aceto} / W_{unsaturated\ polyester}$$

where $C_{aceto}$ represents the concentration of acetoacetyl functional groups, n represents the total molar amount of acetoacetyl functional groups contained in alkyl acetoacetate for preparing the acetoacetyl functional unsaturated polyester, $M_{aceto}$ represents the molar mass of the acetoacetyl functional group, and $W_{unsaturated\ polyester}$ represents the total weight of the acetoacetyl functional unsaturated polyester as prepared.

The concentration of olefinically unsaturated functional groups falling within the range as mentioned above should be sufficient such that the acetoacetyl functional unsaturated polyester can be used as a resin component of a curable coating composition (such as a UV-curable coating composition). In various embodiments, the acetoacetyl functional unsaturated polyester can contain at least 2 wt % of olefinically unsaturated functional groups, relative to the total weight of the acetoacetyl functional unsaturated polyester. In various embodiments, the concentration of the olefinically unsaturated functional groups is between 3 wt % and 6 wt %, or between 3.5 wt % and 5.5 wt %, or between 4 wt % and 5 wt %, relative to the total weight of the acetoacetyl functional unsaturated polyester. The concentration of olefinically unsaturated functional groups in the acetoacetyl functional unsaturated polyester can conveniently be evaluated as follows:

$$C_{C=C}(\% \text{ by weight}) = n \times M_{C=C} / W_{unsaturated\ polyester}$$

where $C_{C=C}$ represents the concentration of olefinically unsaturated functional groups, n represents the total molar amount of olefinically unsaturated functional groups contained in the starting materials for preparing the acetoacetyl functional unsaturated polyester, $M_{C=C}$ represents the molar mass of the carbon-carbon double bond, and $W_{unsaturated\ polyester}$ represents the total weight of the acetoacetyl functional unsaturated polyester as prepared.

The acetoacetyl functional group has strong reactivity since it contains an active methylene group. Under the activating conditions such as UV radiation or heating, Michael addition between such active methylene group with C=C double bonds present in the reaction system will occur. Thus, it can be difficult to modify the resin component containing olefinically unsaturated groups with acetoacetyl functional groups. In a resin modified by acetoacetyl functional groups, when cured with the other component containing olefinically unsaturated groups, it can be difficult to maintain the activity of the acetoacetyl functional groups. The present disclosure is directed to an acetoacetyl functional unsaturated polyester which, when cured with the other component containing olefinically unsaturated groups, may form a cured coating that still maintains its formaldehyde-scavenging capability.

Without wishing to be bound by any theory, presently available evidence indicates that in the preparation of the acetoacetyl functional unsaturated polyester according to the present disclosure, a transesterification reaction is carried out between the alkyl acetoacetate and the hydroxyl groups of the unsaturated ester, thereby achieving modification. During the modification process, the olefinically unsaturated group in the molecular skeleton is difficult to react with the active methylene group of alkyl acetoacetate by Michael addition due to steric hindrance. Instead, the terminal hydroxyl group is relatively easy to react with alkyl acetoacetate by transesterification. Therefore, the unsaturated polyester can be successfully modified with the acetoacetyl functional group while retaining its olefinically unsaturated group.

In the applications of the acetoacetyl functional unsaturated polyester according to the present disclosure, the acetoacetyl functional unsaturated polyester can be cured with other components containing olefinic unsaturated groups, while maintaining its activity of the acetoacetyl functional groups. Under the curing conditions, the acetoacetyl functional unsaturated polyesters are polymerized with the other olefinically unsaturated components easily via C—C double bonds, which avoids significant occurrence of Michael addition. Thus, the resulting cured coating not only has good coating properties, but also retains a considerable amount of the acetoacetyl functional groups.

Preparation of Acetoacetyl Functional Unsaturated Polyester

In another aspect, the present disclosure provides a process for the preparation of a curable resin composition including an acetoacetyl functional unsaturated polyester, wherein the acetoacetyl functional unsaturated polyester includes a branched molecular skeleton containing olefinically unsaturated functional groups therein and acetoacetyl functional groups chemically bonded to the branched molecular skeleton. The acetoacetyl functional unsaturated polyester contains at least 2 wt % of the olefinically unsaturated functional groups, relative to the total weight of the acetoacetyl functional unsaturated polyester; and contains at least 20 wt % of the acetoacetyl functional groups, relative to the total weight of the acetoacetyl functional unsaturated polyester.

The process according to the present disclosure comprises the following steps: (a) reacting by esterification of (i) a carboxylic acid component, at least a portion of which carboxylic acid component includes one or more unsaturated di- or poly-basic carboxylic acid with (ii) an alcohol component, at least a portion of which alcohol component includes one or more di- or poly-basic alcohol, wherein the carboxylic acid component or the alcohol component additionally contains one or more tri- or poly-basic acids or alcohols, thereby forming an unsaturated polyester having a hydroxyl value of 350 mg KOH/g or more and having a branched molecular skeleton containing olefinically unsaturated functional groups therein, wherein the molar equivalent ratio of the alcohol component to the carboxylic acid component is 1.5:1 or more; and (b) reacting the unsaturated polyester formed in step (a) with alkyl acetoacetate by transesterification, thereby forming the acetoacetyl functional unsaturated polyester.

In the above step (a), the carboxylic acid component and the alcohol component are subjected to esterification with an excess alcohol component relative to the carboxylic acid component. In some embodiments, the molar equivalent ratio of the alcohol component to the carboxylic acid component is 1.5:1 or more, or 1.55:1 or more, or 1.6:1 or more. However, various embodiments, the molar equivalent ratio of the alcohol component to the carboxylic acid component is 2.0:1 or less. The resulting hydroxyl-functional unsaturated polyester has a hydroxyl value of at least 350 mg KOH/g resin, or at least 360 mg KOH/g resin, or at least 380 mg KOH/g resin.

As used herein, the term "carboxylic acid component" means a component which provides a carboxylic acid group or a potential carboxylic acid group. When used in the case to form an ester with an alcohol component, the term "carboxylic acid component" also includes an ester-forming derivative thereof, i.e. a compound capable of forming a carboxylic ester with the alcohol component. Ester-forming derivatives of carboxylic acids include, for example, carboxylic anhydrides, acyl halides, the ester of carboxylic acid with a lower alkanol, and the like.

In some embodiments, the carboxylic acid component may include one or more di- or poly-basic unsaturated carboxylic acids. Non-limiting examples thereof can be chosen from maleic acid, fumaric acid, mesaconic acid, citraconic acid, itaconic acid, dichloromaleic acid, the anhydride and combinations thereof. In some embodiments, maleic acid, maleic anhydride or a combination thereof can be used.

In some embodiments, the carboxylic acid component may further include one or more di- or poly-basic saturated carboxylic acids, such as aromatic, aliphatic or combinations thereof, preferably aliphatic. Suitable examples of saturated carboxylic acids include, but are not limited to, phthalic acid, succinic acid, adipic acid, suberic acid, azelaic acid, sebacic acid, isophthalic acid, terephthalic acid, tetrachlorophthalic acid, tetrabromophthalic acid, anhydride or any combination thereof. In some embodiments, adipic acid, phthalic acid, anhydrides thereof, and combinations thereof can be used.

In an embodiment of the present disclosure, the carboxylic acid component includes 10 to 100 mol %, or 40 to 80 mol % of the unsaturated carboxylic acid, relative to the total molar amount of the carboxylic acid component. In an embodiment of the present disclosure, the carboxylic acid component includes 0 to 50 mol %, or 10 to 40 mol % of the saturated carboxylic acid, relative to the total molar amount of the carboxylic acid component. Although the presence of a saturated carboxylic acid is not essential, in some embodiments the saturated carboxylic acid can help reduce the viscosity of the reaction system and to increase the flexibility of the unsaturated polyester.

In some embodiments, the carboxylic acid component can also additionally include one or more tri- or poly-basic carboxylic acids, which can produce an unsaturated polyester having a branched molecular skeleton. Suitable and non-limiting examples of tri- or poly-basic carboxylic acids include aconitic acid, trimellitic acid, anhydride or mixtures thereof. In some embodiments, the carboxylic acid component includes 0.1 to 50 mol %, or 10 to 40 mol %, of the tri- or poly-basic carboxylic acid, relative to the total molar amount of the carboxylic acid component.

As used herein, the term "alcohol component" is understood to be a component which can provide hydroxyl groups, including compounds, oligomers or polymers having one, two or more hydroxyl groups. In various embodiments, the alcohol component may include one or more di- or poly-basic alcohols. Suitable examples include, but are not limited to, ethylene glycol, 1,2-propanediol, 1,3-propanediol, 1,2-butanediol, 1,3-butanediol, 1,4-butanediol, 2-ethyl-1,3-propanediol, 2-methyl-propanediol, 2-butyl-2-ethyl-propanediol, 2-ethyl-1,3-hexanediol, 1,3-neopentyl glycol, 2,2-dimethyl-1,3-pentanediol, 1,6-hexanediol, 1,2- and 1,4-cyclohexanediol, 1,2- and 1,4-bis(hydroxymethyl)cyclohexane, bis(4-hydroxycyclohexyl)methane, ether alcohols (e.g. diethylene glycol, triethylene glycol, or dipropylene glycol), or any combination thereof.

In some embodiments, the alcohol component may additionally include one or more tri- or poly-basic alcohols, which can produce an unsaturated polyester having a branched molecular skeleton. Suitable examples of tri- or poly-basic alcohols include, but are not limited to, pentaerythritol, trimethylol propane, trimethylol ethane, trimethylol hexane, glycerol, hexanetriol, mannitol, sorbitol and combination thereof can be used. In some embodiments, the alcohol component includes 0.1 to 50 mol %, or 10 to 40 mol %, of tri- or poly-basic alcohols, relative to the total molar amount of the alcohol component.

In some embodiments, the alcohol component may include oligomers and/or polymers having two or more hydroxyl groups. Non-limiting examples of suitable polyhydroxy oligomers and/or polymers include polyether polyols, polyester polyols, polycarbonate polyols, polyolefin polyols, or combinations thereof. In some embodiments, the alcohol component can include polyether polyol, polycarbonate polyol, polyolefin polyol, or combinations thereof.

As an example, the polyether polyol having the following formula can be used:

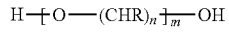

wherein R is hydrogen or an optionally substituted alkyl having up to 6 carbon atoms, n is an integer of 2 to 6, and m is an integer of 10 to 120. Specific examples include, but are not limited to, polyethylene glycol, polypropylene glycol, poly(ethylene glycol-propylene glycol) copolymer, polytetramethylene glycol, and mixtures and combinations thereof. In some embodiments, the polyethylene glycol has a molecular weight of 1,500 to 4,000 g/mol, or 1,800 to 3,000 g/mol, or 2,000 to 2500 g/mol.

In one non-limiting example, the polyester polyol can be obtained by esterification of polycarboxylic acids or anhydrides thereof with polyhydroxy compounds. Polycarboxylic acids and polyols may be aliphatic, aromatic, or a combination thereof. Suitable polyhydroxy compounds include, but are not limited to, alkylene glycols, such as ethylene glycol, 1,2-propanediol, 1,3-propanediol, 1,4-butanediol, neopentyl glycol, 1,6-hexanediol, cyclohexanedimethanol, 2,2-bis(4'-hydroxycyclohexyl) propane; and polybasic alcohols, such as trihydroxyalkyl alkane (e.g., trimethylol propane) or tetrahydroxyalkyl alkane (e.g., pentaerythritol). Other polyhydroxy compounds suitable for esterification may also be used. Suitable polycarboxylic acids include, but are not limited to, polycarboxylic acids having 2-18 carbon atoms, such as phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroheptane dicarboxylic acid, tetrachlorophthalic acid and the like. Other polycarboxylic acids suitable for esterification may also be used.

As an example, the polycarbonate polyol having the following formula can be used:

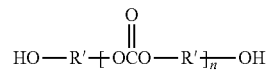

wherein R' is an alkylene group, and n is an integer of 10 to 120.

In various embodiments, these hydroxyl-functional polycarbonate polyols can be prepared by the reaction of polyols such as 1,3-propanediol, 1,4-butanediol, 1,6-hexanediol, diethylene glycol, triethylene glycol, 1,4-dihydroxy-methylcyclohexane, 2,2-bis(4'-hydroxycyclohexyl) propane, neopentyl glycol, trimethylol propane, pentaerythritol, and any combination thereof with a carbonate diester such as dimethyl carbonate, diethyl carbonate, diphenyl carbonate or carbonyl chloride.

In some embodiments, the polyolefin polyol derived from oligomeric or polymeric olefins having at least two terminal hydroxyl groups can be used, and a, co-dihydroxyl polybutadiene is a suitable example.

The suitable conditions for the reaction carried out in step a) are dependent on various factors including, for example, the type of carboxylic acid component or alcohol component used, the presence and type of a catalyst, if any, and may be determined empirically by a person skilled in the art.

In a specific embodiment of the present disclosure, the carboxylic acid component includes a mixture of maleic anhydride, phthalic anhydride and adipic acid; and the alcohol component includes a mixture of pentaerythritol, ethylene glycol and propylene glycol. Preferably, in step a) of this embodiment, maleic anhydride, phthalic anhydride and adipic acid react with pentaerythritol, ethylene glycol, propylene glycol at an elevated temperature and in the absence of catalyst. Acid component and alcohol component respectively are fed in such an amount that the molar equivalent ratio of the alcohol component to the carboxylic acid component is about 1.5:1 to 1.8:1, whereby a hydroxyl functional unsaturated polyester having a branched molecular skeleton can be obtained. The resulting product, i.e., the unsaturated polyester obtained in step a), can be directly used in step b) of the present disclosure.

In step b), an alkyl acetoacetate can be used to functionalize the unsaturated polyester obtained in step a), to form an acetoacetyl functional unsaturated polyester.

Suitable examples of alkyl acetoacetate include, C1-C8 alkyl acetoacetate, and in various embodiments alkyl acetoacetates chosen from methyl acetoacetate, allyl acetoacetate, ethyl acetoacetate, t-butyl acetoacetate, or combination thereof. In some embodiments, the alkyl acetoacetate is t-butyl acetoacetate.

In the process of the present disclosure, alkyl acetoacetate reacts with the unsaturated polyester bearing hydroxyl groups via transesterification, thus acetoacetyl functional groups are attached to the molecule skeleton of unsaturated polyester as end groups or pendant groups. In various embodiments, the molar equivalent ratio of hydroxyl groups in the unsaturated polyester to ester groups in the alkyl acetoacetate ranges from 1.01:1 to 1.2:1, or from 1.05:1 to 1.15:1, or from 1.07:1 to 1.15:1, or from 1.07:1 to 1.10:1.

The suitable conditions for the reaction carried out in step b) are dependent on various factors including the type of unsaturated polyester or alkyl acetoacetate used, the presence and type of catalyst if any and the like, and may determined empirically by a person skilled in the art.

In some embodiments, the transesterification of step b) is carried out in the presence of antioxidants. In various embodiments, relative to the weight of alkyl acetoacetate, the antioxidant is present in an amount of 0.01 wt % to 2.0 wt %, or 0.02 wt % to 1.5 wt %, or 0.03 wt % to 1 wt %, or 0.05 wt. % to 0.8 wt %. In one example embodiment of the present disclosure, which is not intended to be limiting, the antioxidant is hydroquinone.

In a specific embodiment of the present disclosure, t-butyl acetoacetate is used to functionalize the unsaturated polyester, which is preferably prepared by the reaction of maleic anhydride, phthalic anhydride, adipic acid with pentaerythritol, ethylene glycol and propylene glycol.

The curable resin composition including acetoacetyl functional unsaturated polyester obtained by the process as disclosed herein can be used directly in the desired application, such as for formulating a coating composition or a premix.

Premix

In another aspect of the present disclosure, a premix includes a curable resin composition with an acetoacetyl functional unsaturated polyester as disclosed herein; and one or more reactive diluents having two or more olefinically unsaturated groups.

In various embodiments, the premix includes 75 to 90 parts by weight, or 80 to 88 parts by weight, of the curable resin composition including the acetoacetyl functional unsaturated polyester as disclosed herein, relative to the total weight of the premix.

Non-limiting examples of suitable reactive diluents having two or more olefinically unsaturated groups include, ethylene glycol di(meth)acrylate, diethylene glycol di(meth)acrylate, propylene glycol di(meth)acrylate, dipropylene glycol di(meth)acrylate, trimethylol propane tri(meth)acrylate, trimethylol propane ethoxylated tri(meth)acrylate, tripropylene glycol di(meth)acrylate, hexanediol di(meth)acrylate, pentaerythritol tri(meth)acrylate, pentaerythritol tetra(meth)acrylate and combinations thereof. In one embodiment of the present disclosure, tripropylene glycol di(meth)acrylate is used as the reactive diluent having two or more olefinically unsaturated groups.

In various embodiments, the premix includes 10 to 25 parts by weight, or 12 to 20 parts by weight, of the reactive diluents having two or more olefinically unsaturated groups as disclosed herein, relative to the total weight of the premix.

The premix as disclosed herein can be used directly in the desired application, such as for formulating a coating composition.

Coating Composition

In another aspect, the present disclosure is directed to a coating composition including the curable resin composition with an acetoacetyl functional unsaturated polyester as disclosed herein; resins having olefinically unsaturated groups other than the inventive curable resin composition; one or more initiators; optionally one or more reactive diluents having two or more olefinically unsaturated groups; and optional additives.

In one embodiment, the coating composition includes relative to the total weight of the coating composition, (i) 1 to 20 parts by weight of the curable resin composition including acetoacetyl functional unsaturated polyester; (ii) 20 to 98.99 parts by weight of one or more resins having olefinically unsaturated groups other than component (i); (iii) 0.01 to 5 parts by weight of one or more initiators; (iv) optionally 0 to 5 parts by weight of one or more reactive diluents having two or more olefinically unsaturated groups; and (v) optionally 0 to 70 parts by weight of additional additives.

The amount of the curable resin composition including the acetoacetyl functional unsaturated polyester ranges from 1 to 20 parts by weight or from 3 to 20 parts by weight or from 4 to 16 parts by weight or from 4 to 12 parts by weight, relative to the total weight of the coating composition.

Examples of suitable resins having olefinically unsaturated groups include, but are not limited to, polyurethane, epoxy resin, polyamide, chlorinated polyolefin, acrylics resin, and polyesters having olefinically unsaturated groups and mixtures or copolymers thereof, other than the component (i).

Suitably, the amount of the resin having olefinically unsaturated groups other than component (i) ranges from 20 to 98.99 parts by weight, or from 40 to 90 parts by weight, or from 50 to 80 parts by weight, or from 60 to 80 parts by weight, or from 64 to 76 parts by weight, or from 64 to 72 parts by weight, relative to the total weight of the coating composition.

In the coating composition of the present disclosure, the initiator may include a photoinitiator, a thermal initiator, or a combination thereof.

In the case where the coating composition includes a photoinitiator, the coating composition is exposed to UV light to cure. In various embodiments, relative to the total weight of the coating composition, the photoinitiator is present in an amount from about 0.1 to about 5 parts by weight. Photoinitiators suitable for the coating composition of the present disclosure include, but are not limited to, alpha-cleavage type photoinitiators and hydrogen abstraction-type photoinitiators. The photoinitiator may include other agents such as a coinitiator or photoinitiator synergist that aids the photochemical initiation reaction.

Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxycyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentylphosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenyl-phosphine oxide (TPO, commercially available under the trade designation DAROCUR 4265 from Ciba Corp.), 2,4,6-trimethyl benzoylphosphine oxide (commercially available under the trade designation IRGACURE 819, IRGA- CURE 819DW and IRGACURE 2100 from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as those commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. In one embodiment, an initiator mixture is commercially available under the trade designation IRGACURE 500 from Ciba Corp., which is a mixture of IRGACURE 184 and benzophenone, in a 1:1 ratio. This is a good example of a mixture of an α-cleavage type photoinitiator and a hydrogen abstraction-type photoinitiator. Other mixtures of photoinitiators may also be used in the coating compositions of the present disclosure. Camphorquinone is one example of a suitable photoinitiator for curing a coating composition with visible light.

Suitable examples of a coinitiator or photoinitiator synergist include, but are not limited to, tertiary aliphatic amines (such as methyl diethanol amine and triethanol amine), aromatic amines (such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB RadCure Specialties), and combinations thereof.

Preferred photoinitiators include benzophenone, 4-methylbenzophenone, benzoyl benzoate, phenylacetophenones, 2,2-dimethoxy-2-phenylacetophenone, α,α-diethoxyacetophenone, hydroxycyclohexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

If the coating composition includes a thermal initiator, the thermal initiator cures the coating composition via free-radical curing mechanism. Such thermal initiators typically include peroxides or azo compounds. Based on the total weight of the coating composition, the thermal initiator can be present in an amount from about 0.1 to about 5 parts by weight.

Suitable examples of peroxides include, but are not limited to, t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, di-(2-ethylhexyl) peroxydicarbonate or mixtures thereof may be used. Suitable azo compounds include, but are not limited to, 2,2-azobis(2,4-dimethylvaleronitrile), 2,2-azobis (2-methylbutyronitrile), 2,2-azobis(2-methylpropionitrile) or mixtures thereof.

In some embodiments, the coating composition includes a photoinitiator for curing by UV light.

The coating composition according to the present disclosure may optionally include one or more reactive diluents having two or more olefinically unsaturated groups. Examples of suitable reactive diluents include, but are not limited to, compounds having two or more olefinically unsaturated groups, ethylene glycol di(meth)acrylate, diethylene glycol di(meth)acrylate, propylene glycol di(meth) acrylate, dipropylene glycol di(meth)acrylate, trimethylol propane tri(meth)acrylate, trimethylol propane ethoxylated tri(meth)acrylate, tripropylene glycol di(meth)acrylate, hexanediol di(meth)acrylate, pentaerythritol tri(meth)acrylate, pentaerythritol tetra(meth)acrylate and combination thereof. In some embodiments, tripropylene glycol di(meth) acrylate can be used.

Relative to the total weight of the coating composition, the reactive diluents are present in an amount from 0 to 5 parts by weight, or from 0.1 to 5 parts by weight, or from 0.5 to 5 parts by weight.

The coating composition may optionally further include one or more additives such as, for example, surfactants, dispersants, waxes, defoaming agents, rheology-modifying agents, colorants (including pigments and dyes), fillers, heat stabilizers, flow/leveling agents, matting agents, sedimentation inhibitors, photostabilizers, biological agents, plasticizers, solvents or combinations thereof.

In one embodiment, the coating composition contains dispersants, waxes, matting agents, leveling agents, defoaming agents and solvents as additional additives. As examples of dispersants, commercially available dispersant BYK 103 from BYK Corporation may be used. As examples of waxes, commercially available wax powder BYK-Ceraflour 950 from BYK Corporation may be used. As examples of matting agents, commercially available matting agent GRACE 7000 from Grace Corporation of USA may be used. As examples of leveling agents, commercially available level agent BYK 358 from BYK Corporation may be used. As examples of solvents, xylene, propylene glycol monomethyl ether acetate, butyl acetate, and other solvents suitable for coating composition or the combination thereof may be used.

The additives may be present in an amount of 0.1 to 25 parts by weight, or 0.3 to 20 parts by weight, relative to the total weight of the coating composition.

In yet another aspect of the present disclosure, a coating composition is provided including the curable resin composition with acetoacetyl functional unsaturated polyesters as a formaldehyde scavenger. The main body of the coating composition is composed of the mixture of film-forming resin composition and multi-isocyanate curing agents, wherein the film-forming resin composition includes active hydrogen-containing polymers, fillers, and optionally additional additives.

The term "film-forming resin composition" refers herein to a resin composition which constitutes the main body of the coating, and may include active hydrogen-containing polymers, fillers and optionally additional additives.

The active hydrogen-containing polymer includes an active hydrogen reactive to isocyanate groups, and such active hydrogen may be provided by functional groups such as —COOH, —OH, —SH, secondary amino groups and primary amino groups. In addition, some functional groups such as ester groups (especially carboxylate groups), thioether groups or acid anhydride groups (especially carboxylic anhydride groups) may be converted into a functional group which can provide active hydrogen, such as by hydrolysis.

Thus, as used herein, the term "active hydrogen-containing polymer" refers to any polymer that itself contains a functional group capable of providing active hydrogen functional group and/or any polymer that contains functional groups capable of being converted to provide active hydrogen during preparation of the polymer and/or application.

In various embodiments, the film-forming resin composition, relative to the total weight of the film-forming resin composition, includes about 20 wt % to about 55% by weight, or about 35 wt % to about 55% by weight of the active hydrogen-containing polymer. In some embodiments, the film-forming resin composition, relative to the total weight of the film-forming resin composition, can include about 25 wt %, about 30 wt %, about 35 wt %, about 40 wt %, about 45 wt % t or about 50 wt % of the active hydrogen-containing polymer.

The active hydrogen-containing polymers as disclosed above may be prepared by any suitable polymerization processes that are well-known to a skilled in the art.

Suitable film-forming resin compositions preferably further include one or more fillers, which as used herein refers to any volume extender. In some embodiments, the filler is in the form of an organic or inorganic particulate volume extender. The size of the filler may vary within a wide range, for example, from about 50 microns to about 10 nanometers. Examples of suitable fillers include, but are not limited to, talc, calcium carbonate, barium sulfate, magnesium aluminum silicate, silicon oxide, and any combination thereof. In one embodiment, of the present disclosure, highly transparent aluminum magnesium silicate is used as a filler.

The amount of filler in the film-forming resin composition may vary within a wide range. In various embodiments, the film-forming resin composition, relative to the total weight of the film-forming resin, includes about 20 wt % to about 70 wt %, or about 40 wt % to about 65 wt % of fillers. In some embodiments, the film-forming resin composition, relative to the total weight of the film-forming resin composition, includes about 25 wt %, about 30 wt %, about 35 wt %, about 45 wt %, about 50 wt %, about 55 wt %, or about 60 wt % of fillers.

In various embodiments, the film-forming resin composition may further contain additional additives commonly used in coating compositions such as, for example, one or more of diluents, wetting and dispersing agents, defoaming agents, thickeners, pigments or any combination thereof.

As used herein, the term "multi-isocyanate curing agent" means a multi-isocyanate compound, an isocyanate oligomer, or combinations thereof. The multi-isocyanate curing agent contains two or more isocyanate functional groups, which can react with the polymer containing active hydrogen in the form of chain extension and crosslinking, thereby forming a coating having a three-dimensional network structure.

Suitable multi-isocyanate curing agents include aliphatic multi-isocyanate, aromatic multi-isocyanate or any combination thereof. As used herein, the term "aliphatic multi-isocyanate" means a multi-isocyanate compound with an isocyanate group that is directly connected to the aliphatic chain or ring. As used herein, the term "aromatic multi-isocyanate" means a multi-isocyanate compound with an isocyanate group directly connected to the aromatic ring.

Suitable examples of multi-isocyanate compounds include, but are not limited to, hexamethylene diisocyanate, dodecamethylene diisocyanate, cyclohexane-1,4-diisocyanate, 4,4'-dicyclohexyl methane diisocyanate, cyclopentane-1,3-diisocyanate, p-phenylene diisocyanate, toluene-2,4-diisocyanate, naphthalene-1,4-diisocyanate, biphenyl-4,4'-diisocyanate, benzene-1,2,4-triisocyanate, xylene-1,4-diisocyanate, xylene-1,3-diisocyanate, diphenyl methane diisocyanate, butane-1,2,3-triisocyanate or polymethylene polyphenyl polyisocyanate, and combinations thereof.

As an example of suitable isocyanate oligomers, a polyurethane prepolymer of any multi-isocyanate compounds listed above, polyester prepolymer of any multi-isocyanate compounds listed above, or polyether prepolymer of any multi-isocyanate compound listed above and any combination of the prepolymers may be used. Polyurethane prepolymer, polyester prepolymer or polyether prepolymer may be made by any suitable method known to a skilled in the art. For example, polyurethane prepolymers can be made as follows: polyol monomer is reacted with one or more of the multi-isocyanate compounds under suitable conditions; polyester prepolymer or polyether prepolymer can be made as follows: a polyester polyol or polyether polyol is reacted with one or more of the isocyanate compounds under suitable conditions. Alternatively, as a polyurethane prepolymer, polyester prepolymer or polyether prepolymer, any commercially available product may be used.

In one embodiment of the present disclosure, as an example of film-forming resin composition, any commercially available products may be used, such as JN8805 semi-gloss topcoat paint available from Guangdong Huarun Paints Co., LTD. In this embodiment, any suitable commercially available multi-isocyanate curing agent can be used, for example, those available under the trade designations BAYTEC ME 120 or BAYTEC ME 230 from Bayer, Germany; or PR55 from Guangdong Huarun Paints Co., LTD.

In various embodiments, the weight ratio of the film-forming resin composition to the multi-isocyanate curing agent ratio may vary in the range of 100:3-100:10.

The coating composition may be applied to a variety of different substrates using conventional application techniques. Examples of suitable substrate materials include wood, cement, cement fiber board, wood-plastic composites, tile, metal, plastic, glass, and fiberglass. In some embodiments, the coating composition may be particularly suitable for use on wood substrates. Suitable wood substrates include substrates derived from wood materials such as oak (e.g., white oak and red oak), pine (e.g., white pine and southern yellow pine), poplar, spruce, cherry, walnut, redwood, cedar, maple, mahogany, birch, hickory, walnut, ash, and the like. Preferred wood materials for the wood substrate include those that exhibit colors and are susceptible to UV-light discolorations, such as oak, pine, maple, and the like. Moreover, the wood substrate can be engineered wood products, wherein such substrate is made of wood chips (such as sheets, chips, flakes, fibers and filaments).

After exposure to activation conditions, such as UV radiation or heat, the coating obtained from the coating composition as disclosed herein still contains acetoacetyl functional groups and has good formaldehyde scavenging ability.

OTHER EMBODIMENTS

Here are some additional non-limiting embodiments that are intended to further illustrate the present disclosure.

Embodiment 1

A curable resin composition comprising acetoacetyl functional unsaturated polyester which comprises a branched molecular skeleton containing olefinically unsaturated functional groups therein and acetoacetyl functional groups chemically bonded to the branched molecular skeleton, wherein the acetoacetyl functional unsaturated polyester contains at least 2 wt % of the olefinically unsaturated functional groups, relative to the total weight of the acetoacetyl functional unsaturated polyester; and wherein the acetoacetyl functional unsaturated polyester contains at least 20 wt % of the acetoacetyl functional groups, relative to the total weight of the acetoacetyl functional unsaturated polyester.

Embodiment 2

The curable resin composition according to embodiment 1, wherein the acetoacetyl functional unsaturated polyester further has a hydroxyl value of between 5 and 80 mg KOH/g.

Embodiment 3

The curable resin composition according to embodiment 1 or 2, wherein the acetoacetyl functional unsaturated polyester contains 3 wt % to 6 wt % of the olefinically unsaturated functional groups, relative to the total weight of the acetoacetyl functional unsaturated polyester.

Embodiment 4

The curable resin composition according to embodiment 1 or 2, wherein the acetoacetyl functional unsaturated polyester contains 30 wt % or more of the acetoacetyl functional groups, relative to the total weight of the acetoacetyl functional unsaturated polyester.

Embodiment 5

The curable resin composition according to any one of embodiments 1 to 4, wherein the acetoacetyl functional unsaturated polyester is obtained by:

(a) reacting by esterification of (i) a carboxylic acid component, at least a portion of which carboxylic acid component includes one or more unsaturated di- or poly-basic carboxylic acid with (ii) an alcohol component, at least a portion of which alcohol component includes one or more di- or poly-basic alcohol, wherein the carboxylic acid component or the alcohol component additionally contains one or more tri- or poly-basic carboxylic acids or alcohols, thereby forming an unsaturated polyester having a hydroxyl value of 350 mg KOH/g or more and having a branched molecular skeleton containing olefinically unsaturated functional groups therein, wherein the molar equivalent ratio of the alcohol component to the carboxylic acid component is 1.5:1 or more; and (b) reacting the unsaturated polyester formed in step (a) with alkyl acetoacetate by transesterification, thereby forming the acetoacetyl functional unsaturated polyester.

Embodiment 6

The curable resin composition according to embodiment 5, wherein the carboxylic acid component further comprises one or more saturated di- or poly-basic carboxylic acids.

Embodiment 7

The curable resin composition according to embodiment 5, wherein the unsaturated carboxylic acid is selected from the group consisting of maleic acid, fumaric acid, mesaconic acid, citraconic acid, itaconic acid, dichloromaleic acid and the combination thereof.

Embodiment 8

The curable resin composition according to embodiment 6, wherein the carboxylic acid component comprises 10 to 100 mol % of the unsaturated carboxylic acid, relative to the total mole number of the carboxylic acid component.

Embodiment 9

The curable resin composition according to embodiment 5, wherein the carboxylic acid component comprises 0.1 to 50 mol % of the tri- or poly-basic carboxylic acids, relative to the total mole number of the carboxylic acid component.

Embodiment 10

The curable resin composition according to embodiment 5, wherein the alcohol component comprises 0.1 to 50 mol % of the tri- or poly-basic alcohol, relative to the total mole number of the alcohol component.

Embodiment 11

The curable resin composition according to embodiment 5, wherein the tri- or poly-basic carboxylic acid is selected from the group consisting of aconitic acid, trimellitic acid, the anhydride thereof or the combination thereof.

Embodiment 12

The curable resin composition according to embodiment 5, wherein the tri- or poly-basic alcohol is selected from the group consisting of pentaerythritol, trimethylol propane, trimethylol ethane, glycerol, hexanetriol and the combination thereof.

Embodiment 13

The curable resin composition according to embodiment 5, wherein the alkyl acetoacetate is selected from C1-C8 alkyl acetoacetates.

Embodiment 14

The curable resin composition according to embodiment 5, wherein the molar equivalent ratio of hydroxyl group in the unsaturated polyester to ester group in the alkyl acetoacetate ranges from 1.01:1 to 1.2:1.

Embodiment 15

The curable resin composition according to any one of embodiments 1-4, wherein the acetoacetyl functional unsaturated polyester has a molecular weight of 1000 g/mol or more.

Embodiment 16

A process for the preparation of a curable resin composition comprising acetoacetyl functional unsaturated polyester, comprising:

(a) reacting by esterification of (i) a carboxylic acid component, at least a portion of which carboxylic acid component includes one or more unsaturated di- or poly-basic carboxylic acid with (ii) an alcohol component, at least a portion of which alcohol component includes one or more di- or poly-basic alcohol, wherein the carboxylic acid component or the alcohol component additionally contains one or more tri- or poly-basic carboxylic acids or alcohols, thereby forming an unsaturated polyester having a hydroxyl value of 350 mg KOH/g or more and having a branched molecular skeleton containing olefinically unsaturated functional groups therein; and (b) reacting the unsaturated polyester formed in step (a) with alkyl acetoacetate by transesterification, thereby forming the acetoacetyl functional unsaturated polyester.

Embodiment 17

The process according to embodiment 16, wherein the esterification is performed in the presence of an antioxidant.

Embodiment 18

The process according to embodiment 16, wherein the carboxylic acid component further comprises one or more saturated di- or poly-basic carboxylic acid.

Embodiment 19

The process according to embodiment 18, wherein the carboxylic acid component comprises 10 to 100 mol % of the unsaturated carboxylic acid, relative to the total mole number of the carboxylic acid component.

Embodiment 20

The process according to embodiment 16, wherein the carboxylic acid component comprises 0.1 to 50 mol % of the tri- or poly-basic carboxylic acids, relative to the total mole number of the carboxylic acid component.

Embodiment 21

The process according to embodiment 16, wherein the alcohol component comprises 0.1 to 50 mol % of the tri- or poly-basic alcohol, relative to the total mole number of the alcohol component.

Embodiment 22

A premix, comprising the curable resin composition according to any one of embodiments 1-15 or the curable resin composition obtained by the process according to any one of embodiments 16-21; and one or more reactive diluents having two or more olefinically unsaturated groups.

Embodiment 23

The premix according to embodiment 22, comprising:
(i) 75 to 90 wt % of the curable resin composition; and
(ii) 10 to 25 wt % of the reactive diluents; relative to the total weight of the premix.

Embodiment 24

The premix according to embodiment 22, wherein the reactive diluents having two or more olefinically unsaturated groups are selected from the group consisting of ethylene glycol di(meth)acrylate, propylene glycol di(meth)acrylate, trimethylol propane tri(meth)acrylate, trimethylol propane ethoxylated tri(meth)acrylate, tripropylene glycol di(meth)acrylate, hexanediol di(meth)acrylate, pentaerythritol tri(meth)acrylate, pentaerythritol tetra(meth)acrylate and combination thereof.

Embodiment 25

A coating composition, comprising, relative to the total weight of the coating composition,
(i) 1 to 20 parts by weight of the curable resin composition according to any one of embodiments 1-15 or the curable resin composition obtained by the process according to any one of embodiments 16-21;
(ii) 20 to 98.99 parts by weight of one or more resins having olefinically unsaturated groups other than component (i);
(iii) 0.01 to 5 parts by weight of one or more initiators;
(iv) optionally 0 to 5 parts by weight of one or more reactive diluents having two or more olefinically unsaturated groups; and
(v) optionally 0 to 70 parts by weight of additives.

Embodiment 26

The coating composition according to embodiment 25, wherein the olefinically unsaturated groups functional resin comprises olefinically unsaturated groups functional polyurethanes, epoxy resins, polyamides, chlorinated polyolefins, acrylic resins, polyesters, or any mixture or combination thereof.

Embodiment 27

The coating composition according to embodiment 25, wherein the initiators comprise photo-initiators, heat initiators or the combination thereof.

Embodiment 28

The coating composition according to any one of embodiments 25 to 27, which is UV-curable.

Embodiment 29

Cured coating obtained from the coating composition according to any one of embodiments 25 to 28 by UV radiation or heat curing, having formaldehyde-scavenging ability.

Embodiment 30

A coating composition, comprising, relative to the total weight of the coating composition, 1 to 20 parts by weight of the curable resin composition according to any one of embodiments 1-15 as an additive for scavenging formaldehyde; and 80-99 parts by weight of a mixture of a) film-forming resin composition with b) multi-isocyanate curing agent, wherein the film-forming resin composition contains a polymer having active hydrogen, a filler and optional additional additives.

Testing Methods

Adhesion

The adhesion test was performed by the standard test method according to GB/T 1720-1979.

Pencil Hardness

The pencil hardness was assessed using the standard test method according to ASTM D3363.

Solvent Resistance

The solvent resistance test was performed as described in ASTM D 5402 93.

Storage Stability

The storage stability was assessed using the standard test method according to GB/T 6753.3-1986.

Sanding Property

This test was performed using the standard test method according to HG/T 3655.5-2012.

Transparency

This test was performed using the standard test method according to GB/T 1721-2008.

Formaldehyde Content

Formaldehyde content of the sample was determined by the following method: the sample was dissolved in 1:1 mixture of tetrahydrofuran (THF) and acetonitrile (ACN), followed by derivation with 2,4-dinitrophenyl hydrazine. Next, a high performance liquid chromatography (HPLC) apparatus having a UV detector (Waters 1525 Pump, 2487 UV detector, XTerra C18 column) was used to measure formaldehyde content.

Detection conditions were as follows: Mobile phase: A (methanol): B (ultrapure water)=(65:35) (v/v), flow rate of 1.0 mL/min, detection wavelength of 365 nm, in which the column temperature was 35° C.; the injection volume was 20 μL.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available, and used directly as they were originally obtained.

Materials

All the materials used in the examples are listed in Table 1 below:

TABLE 1

The materials and their related information

| Component | Supplier | Simple description |
|---|---|---|
| Methyl acetoacetate (MAA) | Aladdin | CAS: 105-45-3 |
| Maleic anhydride (MA) | Aladdin | CAS: 108-31-6 |
| Phthalic anhydride (PA) | Aladdin | CAS: 85-44-9 |
| Adipic acid (AA) | Alfa Aesar | CAS: 124-04-9 |
| Itaconic acid (ITA) | Alfa Aesar | CAS: 97-65-4 |
| Ethylene glycol (EG) | Aladdin | CAS: 107-21-1 |
| Pentaerythritol (PER) | Alfa Aesar | CAS: 115-77-5 |
| Propylene glycol (PG) | Aladdin | CAS: 57-55-6 |
| Diethylene glycol (DEG) | Aladdin | CAS: 111-46-6 |
| Trimethylol propane (TMP) | Alfa Aesar | CAS: 682-09-7 |
| Hydroquinone (HQ) | Aladdin | antioxidant |
| Tripropylene glycol diacrylate (TPGDA) | J&K Scientific | CAS: 42978-66-5 |

Example 1

The acetoacetyl functional unsaturated polyester according to the present disclosure was prepared by using the components and amounts as listed in Table 2 below.

TABLE 2

| No. | Ingredients | Synthesis Example 1 | Synthesis Example 2 | Synthesis Example 3 | Synthesis Example 4 | Synthesis Example 5 |
|---|---|---|---|---|---|---|
| 1 | MA | 185.2 | — | 185.2 | 185.2 | 185.2 |
| 2 | PA | 93.3 | 93.3 | — | 93.3 | — |
| 3 | AA | 92.0 | 92.0 | 184.0 | 92.0 | 184.0 |
| 4 | EG | 81.9 | 81.9 | 41.0 | — | 81.9 |
| 5 | PER | 179.6 | 179.6 | 269.4 | 179.6 | — |
| 6 | PG | 86.3 | 86.3 | 86.3 | — | 86.3 |
| 7 | HQ | 0.14 | 0.14 | 0.14 | 0.14 | 0.14 |
| 8 | MAA | 640.5 | 640.5 | 640.5 | 640.5 | 640.5 |
| 9 | TPGDA | 353.0 | 311.5 | 205.8 | 320.2 | 412.9 |
| 10 | ITA | | 245.8 | | | |
| 11 | DEG | | | | 260.3 | |
| 12 | TMP | | | | | 353.9 |

Synthesis Example 1

Items 1-7 of the ingredients in the above Table 2 were charged into a four-necked flask equipped with a thermometer, a top stirrer, a gas inlet, and a distilling setup at a room temperature. At the atmosphere of $N_2$, the reaction mixture was heated to 160-200° C., and the resulting water was removed from the mixture through azeotropic distillation. When the acid value reached 57.4 mg KOH/g, the mixture was cooled to 90° C., thereby obtaining the unsaturated polyester terminated with hydroxyl groups including a branched molecular skeleton and having a hydroxyl value of 393.3 mg KOH/g resin.

Then item 8 of the ingredients was added. The mixture was heated to 120-160° C., and the resulting methanol was removed from the mixture through azeotropic distillation with a column head temperature of 80±2° C. When the distillation mass was closed to theoretical value, the temperature of the column head temperature dropped below 50° C. Thus, the mixture comprising acetoacetyl functional unsaturated polyester was obtained. As determined by GPC, the resulting mixture has a number average molecular weight of more than 1000 g/mol.

Then the temperature of the reaction mixture was decreased below 90° C., and item 9 of the ingredients was added to obtain a light yellow transparent liquid. Such mixture can be used to formulate a coating composition.

After titration, the content of the acetoacetyl functional groups is 24.3 wt %, relative to the total weight of the acetoacetyl functional unsaturated polyester.

Synthesis Example 2

A polymer was prepared by the process as shown in Synthesis example 1 except that item 1 was replaced with item 10, and the amount of item 9 was adjusted.

Synthesis Example 3

A polymer was prepared by the process as shown in Synthesis example 1 except that the amounts of items 2, 3, 5 and 9 were adjusted.

Synthesis Example 4

A polymer was prepared by the process as shown in Synthesis example 1 except that items 4 and 6 were replaced with item 11, and the amount of item 9 was adjusted.

Synthesis Example 5

A polymer was prepared by the process as shown in Synthesis example 1 except replacing item 5 with item 12, and the amount of item 9 was adjusted.

Example 2: Formaldehyde-Scavenging Test 100 mL of UV-curable coating compositions which were available by the trade name of UA 5002, including 0 ppm, 10 ppm and 40 ppm of formaldehyde, respectively, were blended with 5% of the sample obtained in Synthesis example 1. Then, these mixtures were stored at room temperature for four days and then were measured HPLC to determine its free-formaldehyde contents. The coating composition which did not contain the sample of Synthesis example 1 was used as a comparative example.

Results were shown in Table 3.

TABLE 3

| No. | Sample | Free-formaldehyde content/ppm (without sample) | Free-formaldehyde content/ppm (with sample) |
|---|---|---|---|
| 1 | UA 5002 | 28.0 | 7.0 |
| 2 | UA 5002 + 10 ppm formaldehyde | 36.3 | 15.7 |
| 3 | UA 5002 + 40 ppm formaldehyde | 66.7 | 28.3 |

The acetoacetyl functional unsaturated polyester according to the present disclosure exhibits excellent formaldehyde-scavenging ability when incorporated into a coating composition.

Example 3: UV-Cured Coating

The bright yellow liquid prepared in Synthesis Example 1 was mixed with a commercially available UV-curable coating composition (UA5002, commercially available from Guangdong Huarun Paints Co., Ltd.) to form a coating composition, wherein the sample from Synthesis Example 1 was used in an amount of 5 wt % relative to the total weight of UV-curable coating composition. The curing was done in the following conditions: curing speed of 0.5 m/min, exposed to a UV coating machine (wherein the UV area has a length of 1.2 m) having a power density of 80 W/mm, resulting in a UV-cured coating, i.e. UV coating. The performance of the cured coating was measured according to the methods listed in the Test Methods, and the results were shown in Table 4.

TABLE 4

| Performance of cured film | | |
|---|---|---|
| | Comparative Example without sample | Example with 5% of sample |
| Curing speed | 8 m/min | 8 m/min |
| Pencil hardness | 2H | 2H |
| Adhesion | good | good |
| Transparency | good | good |
| Sanding property | good | good |
| Resistance to methyl ethyl ketone (MEK) | >100 | >100 |
| Storage stability (60° C., 15 days) | OK | OK |

The acetoacetyl functional unsaturated polyesters according to the present disclosure, when mixed with the commercially available UV curable coating composition and then cured by UV light, may produce a coating having excellent coating performance.

Example 4: Formaldehyde-Scavenging Test of the Cured Coating

Similar to Example 2, the sample prepared in Synthesis Example 1 was mixed with commercially available polyester coating composition (PE Coating, commercially Guangdong Huarun Paints Co., Ltd. good home series PE primer JD401) to form a coating composition, wherein the sample from Synthesis Example 1 was used in an amount of 5 wt % relative to the total weight of the UV-curable coating composition. The coating formed therefrom was cured in the presence of cobalt naphthenate and methyl ethyl ketone peroxide at room temperature, to obtain a cured coating, i.e. a PE coating.

The resulting PE coating and the UV coating from Example 3 were measured for the formaldehyde-scavenging ability. 20 g formaldehyde solutions (formaldehyde content was 40 or 80 ppm) were added with 1.0 g cured-film of UV and PE coating, respectively. Then PH value of the solutions was adjusted to >9, and the solution was mixed well. After these solutions were standing at room temperature for 1 day, the free-formaldehyde contents were measured by HPLC. The test results were shown in Table 5.

TABLE 5

| No. | Coatings | formaldehyde content in solution(ppm) | Free-formaldehyde content (mg/kg) |
|---|---|---|---|
| 1 | UV coating | 40.0 | ND* |
| 2 | UV coating | 80.0 | ND* |
| 3 | PE coating | 40.0 | ND* |
| 4 | PE coating | 80.0 | 1.1 |

*lower than detection limit of 1.0 mg/kg

The coating composition including the acetoacetyl functional unsaturated polyesters according to the present disclosure still has excellent formaldehyde-scavenging ability even if cured by exposure to UV radiation.

Example 5: Coating Composition

The sample prepared in Synthesis Example 1 was mixed with commercially available polyurethane coating composition (JN8805 semi-gloss top-coat paint, from Guangdong Huarun Paints Co., Ltd.), a curing agent (PR55, from Guangdong Huarun Paints Co., Ltd.) and a diluent (PX801, from Guangdong Huarun Paints Co., Ltd.), to form a coating composition, wherein the sample from Synthesis Example 1 was used in an amount of 5 wt %, relative to the total weight of the coating composition. The coating composition was sprayed or brushed onto the wood substrates, dried at room temperature for 4 hours to obtain a cured coating (PU coating).

The resulting cured coating was measured for the formaldehyde-scavenging ability. 20 g formaldehyde solutions (containing 40 or 80 ppm formaldehyde) were added with 1.0 g cured coating as described above. Then PH value of the solutions was adjusted to >9, and the solution was mixed well. After these solutions were standing at room temperature for 1 day, the free-formaldehyde contents were measured by HPLC. The test results were shown in Table 6.

TABLE 6

| No. | Coating | formaldehyde content in solution (ppm) | Free-formaldehyde content (mg/kg) |
|---|---|---|---|
| 1 | PU coating | 40.0 | 1.7 |
| 2 | PU coating | 80.0 | 12.8 |

The acetoacetyl functional unsaturated polyesters according to the present disclosure, when used as formaldehyde scavenger in a conventional commercially available polyurethane coating, exhibited good formaldehyde-scavenging.

Various embodiments of the invention have been described. These and other embodiments are within the scope of the following claims.

The invention claimed is:

1. A curable resin composition comprising:
   an acetoacetyl functional unsaturated polyester comprising a branched molecular skeleton containing olefinically unsaturated functional groups therein and acetoacetyl functional groups chemically bonded to the branched molecular skeleton, wherein the acetoacetyl functional unsaturated polyester has a hydroxyl value of between 5 and 80 mg KOH/g and contains:
   3 wt % to 6 wt % of the olefinically unsaturated functional groups, relative to the total weight of the acetoacetyl functional unsaturated polyester; and
   at least 20 wt % of the acetoacetyl functional groups, relative to the total weight of the acetoacetyl functional unsaturated polyester; and
   wherein the acetoacetyl functional unsaturated polyester is obtained by:
   (a) reacting by esterification: (i) a carboxylic acid component, at least a portion of which comprises one or more unsaturated di- or poly-basic carboxylic acids, with (ii) an alcohol component, at least a portion of which comprises one or more di- or poly-basic alcohols, wherein the carboxylic acid component or the alcohol component additionally comprise one or more tri- or poly-basic acids or alcohols, thereby forming an unsaturated polyester having a hydroxyl value of 350 mg KOH/g or more and having a branched molecular skeleton containing olefinically unsaturated functional groups therein, wherein the molar equivalent ratio of the alcohol component to the carboxylic acid component is 1.5:1 or more; and
   (b) reacting the unsaturated polyester formed in step (a) with alkyl acetoacetate by transesterification, thereby forming the acetoacetyl functional unsaturated polyester, wherein the molar equivalent ratio of hydroxyl groups in the unsaturated polyester to ester groups in the alkyl acetoacetate ranges from 1.01:1 to 1.2:1.

2. The curable resin composition according to claim 1, wherein the carboxylic acid component comprises 10 to 100 mol % of the unsaturated carboxylic acid, relative to the total molar amount of the carboxylic acid component.

3. The curable resin composition according to claim 1, wherein the carboxylic acid component comprises 0.1 to 50 mol % of the tri- or poly-basic carboxylic acid, relative to the total molar amount of the carboxylic acid component.

4. The curable resin composition according to claim 1, wherein the alcohol component comprises 0.1 to 50 mol % of the tri- or poly-basic alcohol, relative to the total molar amount of the alcohol component.

5. The curable resin composition according to claim 1, wherein the alkyl acetoacetate is chosen from $C_1$-$C_8$ alkyl acetoacetates.

6. The curable resin composition according to claim 1, wherein the acetoacetyl functional unsaturated polyester has a molecular weight of 1000 g/mol or more.

7. A premix comprising the curable resin composition according to claim 1; and one or more reactive diluents having two or more olefinically unsaturated groups.

8. The premix according to claim 7, wherein the reactive diluents having two or more olefinically unsaturated groups are chosen from ethylene glycol di(meth)acrylate, propylene glycol di(meth)acrylate, trimethylol propane tri(meth)acrylate, trimethylol propane ethoxylated tri(meth)acrylate, tripropylene glycol di(meth)acrylate, hexanediol di(meth)acrylate, pentaerythritol tri(meth)acrylate, pentaerythritol tetra(meth)acrylate and combinations thereof.

9. A coating composition, comprising, relative to the total weight of the coating composition,
   (i) 1 to 20 parts by weight of the curable resin composition according to claim 1;
   (ii) 20 to 98.99 parts by weight of one or more resins having olefinically unsaturated groups other than component (i);
   (iii) 0.01 to 5 parts by weight of one or more initiators;
   (iv) optionally 0 to 5 parts by weight of one or more reactive diluents having two or more olefinically unsaturated groups; and
   (v) optionally 0 to 70 parts by weight of additives.

10. The coating composition according to claim 9, wherein the composition is UV-curable.

11. A coating composition comprising, relative to the total weight of the coating composition:
   (i) 1 to 20 parts by weight of the curable resin composition according to claim 1 as a formaldehyde scavenging agent; and
   (ii) 80 to 99 parts by weight of a mixture of
      a) a film-forming resin composition comprising an active hydrogen-containing polymer, fillers and optional additives; and
      b) a multi-isocyanate curing agent.

* * * * *